United States Patent
Iguchi et al.

(10) Patent No.: US 7,440,621 B2
(45) Date of Patent: Oct. 21, 2008

(54) ATTRACTIVE FACIAL IMAGE DETERMINING SYSTEM

(75) Inventors: Takeyoshi Iguchi, Hachioji (JP); Toru Sugahara, Ueda (JP); Tsugutake Sadoyama, Ueda (JP); Masayoshi Kamijo, Ueda (JP); Yoshio Shimizu, Ueda (JP)

(73) Assignee: Konica Minolta Holdings, Inc. (JP)

( * ) Notice: Subject to any disclaimer, the term of this patent is extended or adjusted under 35 U.S.C. 154(b) by 498 days.

(21) Appl. No.: 11/077,661

(22) Filed: Mar. 10, 2005

(65) Prior Publication Data

US 2005/0207648 A1    Sep. 22, 2005

(30) Foreign Application Priority Data

Mar. 17, 2004    (JP)    ............................. 2004-075431

(51) Int. Cl.
*G06K 9/62*    (2006.01)
*G06K 9/20*    (2006.01)
*G06K 9/46*    (2006.01)

(52) U.S. Cl. ........................ 382/224; 382/282; 382/190

(58) Field of Classification Search ................. 382/117, 382/118, 190, 199, 282, 291, 224
See application file for complete search history.

(56) References Cited

U.S. PATENT DOCUMENTS

| | | | | |
|---|---|---|---|---|
| 5,450,504 | A | * | 9/1995 | Calia ........................... 382/118 |
| 6,633,655 | B1 | * | 10/2003 | Hong et al. ................. 382/118 |
| 6,879,709 | B2 | * | 4/2005 | Tian et al. ................... 382/118 |
| 7,092,564 | B2 | * | 8/2006 | Jia et al. ...................... 382/162 |
| 7,233,684 | B2 | * | 6/2007 | Fedorovskaya et al. ..... 382/118 |
| 2005/0074148 | A1 | * | 4/2005 | Rodyushkin et al. ........ 382/118 |

FOREIGN PATENT DOCUMENTS

| JP | 11-167626 A | * | 6/1999 |
|---|---|---|---|
| JP | 2003178311 A | * | 6/2003 |

* cited by examiner

*Primary Examiner*—Colin LaRose
(74) *Attorney, Agent, or Firm*—Squire, Sanders & Dempsey L.L.P.

(57) ABSTRACT

An attractive facial image determining system, including a first detecting section for detecting lateral angle points of both eyes in a facial image; a second detecting section for detecting oral angle points; a constructing section for constructing a rectangle which is formed of a line segment made by a side that passes through the lateral angle points of both eyes detected by the first detecting section, and an opposed line segment that passes through both oral angle points detected by the second detecting section; and a determining section which obtains a ratio of a long side and a short side of the rectangle obtained via the constructing section, and determines whether the ratio is within a predetermined range.

7 Claims, 3 Drawing Sheets

ATTRACTIVE FACIAL IMAGE DETERMINING SYSTEM

BACKGROUND OF THE INVENTION

The present invention relates to an image processing system which detects a change in a predetermined region of a facial image and decides a facial expression.

Generally, major elements for deciding a good picture of a photographed person include facial expression, color of the face, lighting and shading of the face, and photographic angle of the face. Among these, the most dominant element is the facial expression of the photographed person. However, since the facial expression always changes, it is difficult to catch the optimal photo opportunity. Further, depending on circumstances, a person to be photographed often cannot express the desired expression, due to not only feelings of tension but also other circumstance in which not-smiling person, on a routine bases, cannot control facial muscles for the desired expression.

In conventional analog photography, the above-described problem has been solved by the photographer guiding the person to be photographed, and also by photographic technology via which the photographer captures the best photo opportunity. Further, when a photographed image has something wrong or also when it is impossible to capture the image again, the solution is re-touching, in which a skilled person modifies an original picture by hand painting. However, such methods of manual image modification can at most enhance a face with closed eyes or wrinkles, but it is difficult to actually change the facial expression.

On the contrary, in an image taken by digital means, or an image which is digitized from an analog image via a scanner, it is relatively easy compared to the analog image to perform image modification after photography. However when major image modification of a facial expression is conducted, the facial image may become quite artificial.

Accordingly, it is preferable that the digitally photographed facial expression is initially the best one possible, like that of the analog photography.

Often the favored facial expression is a smiling face. With respect to a facial expression captured by photographic means, if it is possible to determine a smiling face, it is then possible to detect the optimal photo opportunity, that is, after reading continually changing facial expression as digital images, these interpreted as smiling expressions can be selected and stored in a memory means. Yet further, among plural facial images stored in the memory means, only the images of the smiling faces can be extracted with relative ease.

It is well-known that the facial expression is greatly changed owing to the small changes of shape, position and angle, with respect to an eye, an eyebrow and the mouth, which happen in a time as short as 0.3 sec. Widely proposed are technologies based on the above-described well-known art, by applying digital image processing technology, changing or displacing the fundamental predetermined regions of the facial image, such as an eye, an eyebrow and the mouth, the facial expression of a smile, anger, surprise and sorrow can be formed (See for example, Patent Document 1).

However, in order to determine the expression of a facial image, a great number of data must first be processed with respect to the facial image of an individual person, each of course having different facial characteristics. Next, those characteristics must be selected from the data, from which the chosen expression must be determined. However, practical problems, such as excessively long processing time and the high cost of such an apparatus, still exist.

In portrait photography, when a smiling face, as seemed to be the best representative expression, is to be automatically captured, the above-described problems occur. [Patent Document 1: JP-A 11-167626 (Pages 1-2)]

(JP-A means Japanese Patent Application publication.) [Document 1: Muscle Activity Patterns and Geometrical Features in Attractive Facial Expressions (Sugahara et. al), Proceedings of the 5$^{th}$ Annual Conference of JSKE 2003]

SUMMARY OF THE INVENTION

The present invention has been achieved based on the above-described conditions. The objective of the present invention is to provide an image processing system wherein a figure construction is performed based on the position of predetermined regions of a facial image captured via a photographic means, and the characteristics of the obtained figure is correlated with the facial expressions, whereby, the smiling face can be quickly chosen with ease.

The above described objective is attained by realizing the structures described below.

Structure 1

An image processing system, including:

a first detecting means for detecting lateral angle points of both eyes (which mean outer corners of the eyes) in a facial image;

a second detecting means for detecting both oral angle points (which mean outer corners of the mouth); and a constructing means for constructing a rectangle using a first line segment drawn between both lateral angle points of the eyes detected by the first detecting means, as well as using a second line segment which passes through both oral angle points detected by the second detecting means and is parallel to the first line segment and the same length as the first line segment.

Structure 2

The image processing system in Structure 1, further including a determining means for calculating the ratio of the long side and the short side of the rectangle obtained via the constructing means, and for determining whether the ratio is within a predetermined range.

Structure 3

The image processing system in Structure 2, further including:

a photographing means for photographing a facial image;

a sound outputting means for outputting an audible signal;

a control means for activating a shutter of the photographic means, and controlling the sound outputting means to output an audible signal, when the determining means calculates that the ratio is within the predetermined range.

Structure 4

An image processing system, including:

an image display means for displaying a facial image:

a memory means for storing a facial image:

a first detecting means for detecting the lateral angle points of both eyes in the facial image;

a second detecting means for detecting both oral angle points;

a constructing means for constructing a rectangle using a first line segment drawn between both lateral angle points of the eyes detected by the first detecting means, as well as using a second line segment which passes through both oral angle points detected by the second detecting means and is parallel to the first line segment and the same length as the first line segment; and a control means for reading a facial image from plural facial images stored in the memory means and displaying on the image displaying means the facial image which has a rectangle ratio of the long side and the short side within a predetermined range.

Structure 5

An image processing system, including:

an image display means for displaying a facial image:

a memory means for storing a facial image:

a first detecting means for detecting the lateral angle points of both eyes in the facial image;

a second detecting means for detecting both oral angle points;

a constructing means for constructing a rectangle using a first line segment drawn between both lateral angle points of the eyes detected by the first detecting means, as well as using a second line segment which passes through both oral angle points detected by the second detecting means and is parallel to the first line segment and the same length as the first line segment;

a control means for reading a facial image from plural facial images stored in the memory means, and displaying the facial image which has a rectangle having a ratio of a long side and a short side within a predetermined range on the image displaying means, within which a specific image frame is attached.

DETAILED DESCRIPTION OF THE PREFERRED EMBODIMENT

Figure 1:
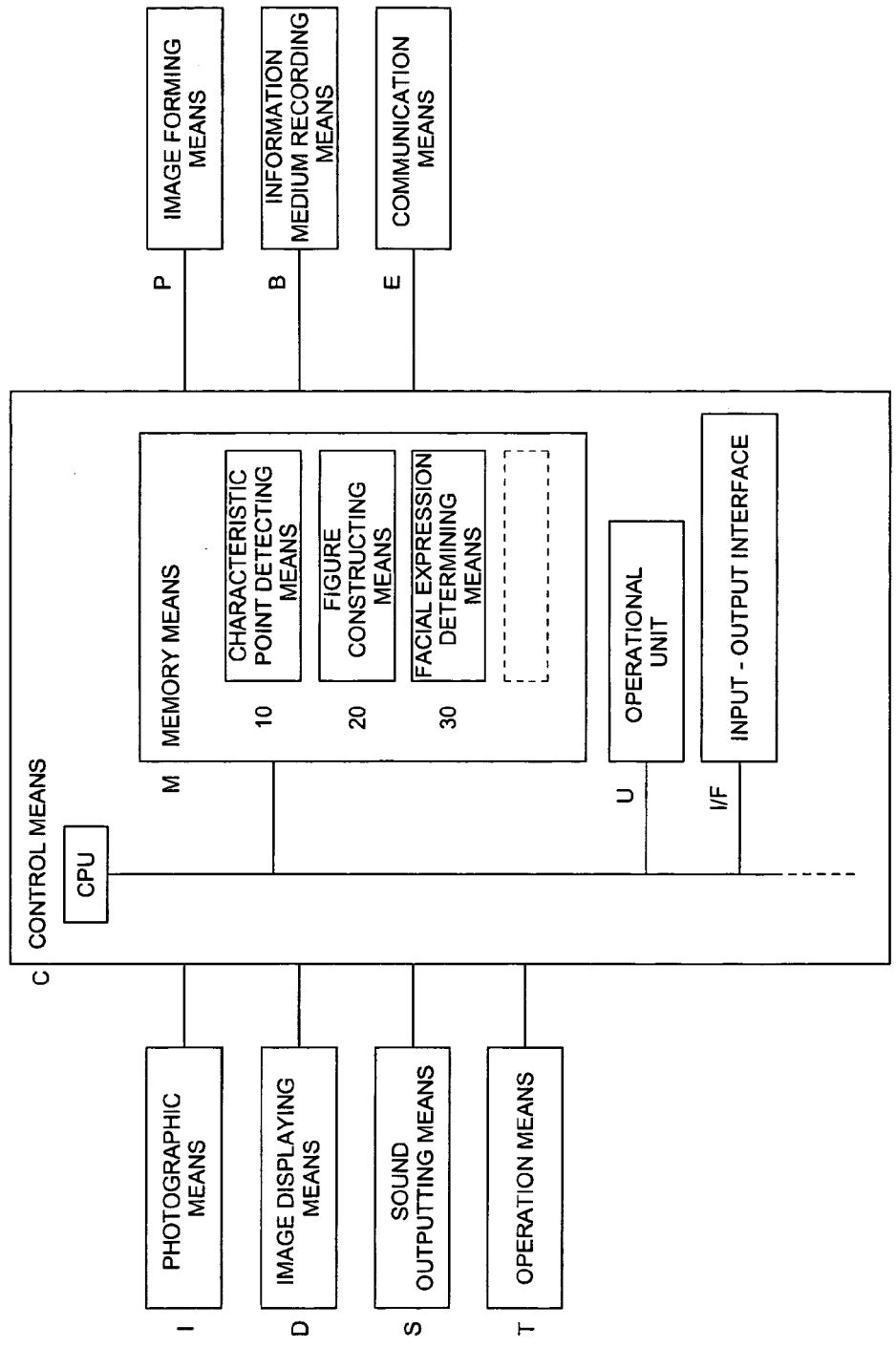
FIG. 1 is a block diagram showing a control system of an image processing system.

The present invention will now be detailed referring to the drawings.

FIG. 1 is a block diagram of an image processing system based on the present invention.

The present image processing system includes control means C, photographic means I, image displaying means D, sound outputting means S, operation means T, image forming means P, information medium recording means B and communication means E.

Control means C is a computer system incorporating memory M as a memory means, operational unit U and various input-output interfaces I/F.

Characteristic point detecting means 10, figure constructing means 20 and facial expression determining means 30 are stored in memory M, all of which are software, and the prescribed processes are conducted by programs which structure each of these means. Additionally, concerning software used for characteristic point detecting means 10, an appropriate software can be selected from among the several software products used for facial image recognition.

Photographic means I is a digital camera, which captures a picture of a photographic subject based on control signal from control means C. Plural images can be photographed in a predetermined time, or at a predetermined frequency, or a single image in a brief moment can be photographed. The photographed image (which is an original image) is sent to memory M of control means C and stored in a prescribed format. Further in some cases, a prescribed process is conducted onto the original image, which is then stored after a compressing process is carried out.

Image displaying means D is a device, such as a CRT or a liquid crystal display, which displays text characters and the images, and allows selection from among them.

Sound outputting means S is a small speaker, which can be incorporated into photographic means I or image displaying means D.

Operation means T is an input device, such as a key board or a mouth, which is used for a regular computer, and allows selection from among them. Further, in some cases, a touch panel can be used, in which a transparent film having transparent electrodes is adhered onto the screen of image display means D.

Image forming means P is a means for outputting hard copies chosen from among the selected images via operation means T, and can be produced from a silver halide photographic printer, an ink-jet printer, an electro-photographic printer, a sublimation type thermal printer, or a fusion type thermal printer.

Information medium recording means B can be selected from a floppy disk drive, a CD writer, a DVD writer and an MO disk drive.

Communication means E is a communication interface for transferring the image, selected by the selecting operation of operation means T, to other image processing systems via communication lines. Any device having the specification conforming to the communication line connection can be used.

Figure 2:
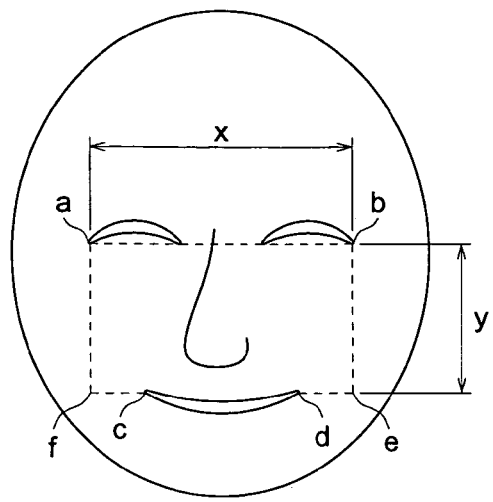
FIG. 2 explains a rectangle constructing process.

FIG. 2 shows a rectangle (shown by dashed lines) which is constructed in such a way that characteristic point detecting means 10 detects lateral angle points of the eyes "a" and "b" and oral angle points "c" and "d", from which figure constructing means 20 constructs the rectangle, based on points "a" "b" "c" and "d". In this case, corner points of the eyes (which are canthus points) mean the intersecting points of an upper lid and a lower lid, and the lateral angle points of the eyes mean the outer points of each eye of the above described intersecting points. Further, the oral angle points mean the intersecting points of the upper and lower lips.

Firstly, figure constructing means 20 constructs line segment $\overline{ab}$. Next, figure constructing means 20 constructs a straight line parallel to line segment $\overline{ab}$ through oral angle points "c" and "d". If the straight line parallel to line segment $\overline{ab}$ passes through only one point of oral angle points "c" and "d", figure constructing means 20 constructs a straight line passing through the middle point of line segment $\overline{cd}$. Perpendicular lines are dropped from points "a" and "b" to the straight line passing through points "c" and "d" at "f" and "e", that is, rectangle "abef" is constructed. In this case, both lengths of line segments $\overline{ab}$ and $\overline{ef}$ is "x", and both lengths of line segments $\overline{af}$ and $\overline{be}$ is "y".

Figure 3:
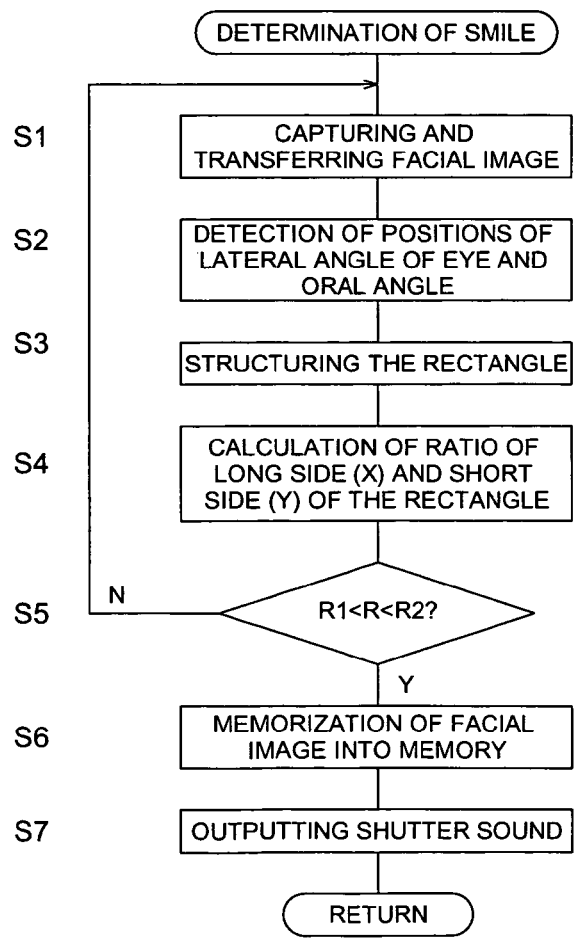
FIG. 3 is flow chart showing the steps of determination of the facial expression.

FIG. 3 is a flow chart showing the procedures described below.

A facial image of a subject is captured by photographing means I.

The lateral angle points of the eyes and the oral angle points of the facial image are detected by characteristic point detecting means 10.

Rectangle "abef" of the facial image is constructed by figure constructing means 20.

Facial expression determining means 30 obtains a ratio of long side "x" and short side "y" of rectangle "abef" and determines whether the ratio is within the predetermined range.

Memory means M memorizes the facial image when the facial image falls within the ratio of the predetermined range.

Photographing means "I" takes the facial image of the subject and sends the facial image as facial image data to control means C (Step 1).

Characteristic point detecting means 10 detects the eyes and the mouth of the facial image from among the facial image data, and determines the position of tails of the eyes (which are the lateral angle points of the eyes) as well as the position of both ends of the lips (which are the oral angle points) (Step S2).

Figure constructing means 20 constructs the rectangle, shown by the dashed lines in FIG. 2, within the facial image, by the above-described procedure (Step S3).

Facial expression determining means 30 obtains lengths x and y of the long side (which is $\overline{ab}$ or $\overline{ef}$) and short side (which is $\overline{af}$ or $\overline{be}$) respectively, and calculates ratio R (R=x/y) of the long side and the short side based on the obtained line segment values (Step S4). Next, facial expression determining means 30 reads out values R1 and R2, previously set in a table of memory means M, and determines whether value R, obtained in step 4, satisfies inequalities R1<R<R2 (Step 5).

If R is in the range shown by inequalities R1<R<R2, facial expression determining means 30 determines as a smiling face (Step S5: Y), and stores the image data in a predetermined file in memory means M (Step 6), and further, outputs the shutter sound to sound outputting means S (Step 7). However, if R is not in the range shown by inequalities R1<R<R2, (Step S5: N), facial expression determining means 30 obtains another facial image from photographing means I (Step 1), repeating the above-mentioned processes of Steps 2-5.

Additionally, in the above explanation of the present flow chart, the facial image is captured by photographing means I, however, instead of using photographing means I, it is also possible to sequentially read out facial image information from the files in memory means M in which several facial images are stored.

Further, it is possible to employ the structure in which plural photographing means are provided, and the facial expression is determined by the facial image determining means with respect to the facial image captured by a single photographing means, and thereby the other photographing means are energized to operate the shutters. In this case, "the other photographing means" are not limited to digital cameras, but analog cameras may also be employed.

Figure 4:
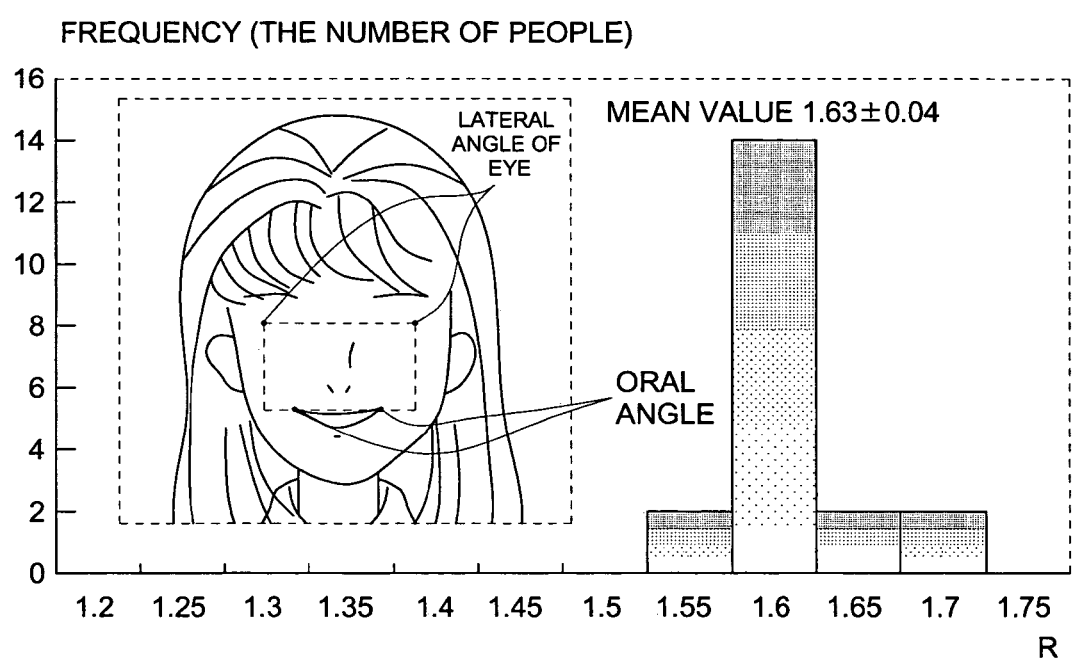
FIG. 4 is a histogram showing the frequency of aspect ratios of the rectangle in the smiling face.

FIG. 4 is a histogram, in which twenty adult men and women were photographed as they expressed blank faces and when they smiled, after that, the above-mentioned ratios were obtained from their facial images so that the frequency of R are shown as the histogram. In the case of a blank face, R=1.40±0.07 (see Table 1), while in the case of smiling face, R=1.63±0.04. Ratio R of the rectangle of the smiling face is decided by moving of the greater zygomatic muscles which pull up the oral angles.

Table 1 shows the range of ratio R of the facial expressions which were obtained via the experiments by the inventor of the present invention. Since the ranges of various facial expressions are stored in the memory section, which is previously selected by the photographer, the photographic system of the present invention can detect the quick change of the facial expression of the subject, and thereby, the photographic system can automatically capture the image of the subject, when the subject naturally expresses the predetermined facial expression.

TABLE 1

| | Facial expressions | | | |
|---|---|---|---|---|
| | blank face | Smile | grin | laugh |
| Adult | 1.40 ± 0.07 | 1.53 ± 0.03 | 1.63 ± 0.04 | 1.68 ± 0.05 |
| Preschooler | — | — | 1.70 ± 0.04 | — |
| Baby | — | — | 1.78 ± 0.03 | — |

From the experimental result described above, it is understood that a facial image having R in a certain range has a high possibility that the facial image is any one of a blank face, a smiling face, a grin face or a laughing face.

Concerning advantageous effects of this invention, according to the invention in structure 1, some characteristics of a facial expression can be converted to numerical characteristics.

According to structure 2 of the invention, the numerical characteristic of a facial expression can be quickly determined from the ratio of a long side and a short side of the rectangle obtained by structure 1.

According to structure 3 of the invention, it is possible to announce the photographed moment to the photographed subject indicating the end of a photo and prepare for the next exposure. Further when the shutter sound occurs, if the subject memorizes the tightness of the zygomatic muscles of a specific facial expression, he/she can more easily express the better face for the next exposure.

According to structure 4 of the invention, it is possible to select a desired facial image from among a large number of the captured facial images stored in the memory means.

According to structure 5 of the invention, a large number of captured facial images are displayed on the image display means, and distinguishing marks are attached to the facial images having a desired condition, and thereby, it is possible to easily select the faces of the attractive expressions from among the displayed facial images.

What is claimed is:

1. An attractive facial image determining system, comprising:
   a first detecting section for detecting lateral angle points of both eyes in a facial image;
   a second detecting section for detecting oral angle points in a facial image;
   a constructing section for constructing a rectangle which is formed of a line segment made by a side that passes through the lateral angle points of both eyes detected by the first detecting section, and an opposed line segment that passes through both oral angle points detected by the second detecting section; and
   a determining section which obtains a ratio of a long side and a short side of the rectangle obtained via the constructing section, and determines whether the ratio is within a predetermined range, for a smiling face of adults, for a grinning face of adults, and for a laughing face.

2. An attractive facial image determining system comprising:
   a first detecting section for detecting lateral angle points of both eyes in a facial image;
   a second detecting section for detecting oral angle points in a facial image;

a constructing section for constructing a rectangle which is formed of a line segment made by a side that passes through the lateral angle points of both eyes detected by the first detecting section, and an opposed line segment that passes through both oral angle points detected by the second detecting section;

a determining section which obtains a ratio of a long side and a short side of the rectangle obtained via the constructing section, and determines whether the ratio is within a predetermined range, for a smiling face of adults, for a grinning face of adults, and for a laughing face;

a photographing section for photographing a facial image;

a sound outputting section for outputting an audible signal; and a control section for activating a shutter of the photographing section, and controlling the sound outputting section to output the audible signal, when the determining section determines that the ratio of the long side and the short side of the rectangle is within the predetermined range.

3. The attractive facial image determining system of claim 2, wherein the predetermined range of the ratio for a smiling face of adults is 1.53±0.03.

4. The attractive facial image determining system of claim 2, wherein the predetermined range of the ratio for a grinning face of adults is 1.63±0.04.

5. The attractive facial image determining system of claim 2, wherein the predetermined range of the ratio for a laughing face of adults is 1.68±0.05.

6. An attractive facial image determining system, comprising:

an image display section for displaying a facial image;

a memory section for memorizing the facial image;

a first detecting section for detecting lateral angle points of both eyes in the facial image;

a second detecting section for detecting the oral angle points in the facial image;

a constructing section for constructing a rectangle which is formed of a line segment made by a side that passes through the lateral angle points of both eyes detected by the first detecting section, and an opposed line segment that passes through both oral angle points detected by the second detecting section;

a determining section which obtains a ratio of a long side and a short side of the rectangle obtained via the constructing section, and determines whether the ratio is within a predetermined range; and a control section for reading a facial image from plural facial images memorized in the memory section and displaying on the image displaying section the facial image which has the ratio within the predetermined range, for a smiling face of adults, for a grinning face of adults, and for laughing face of adults.

7. The attractive facial image determining system of claim 6, wherein the control section applies a frame onto the facial image having the ratio within the predetermined range, displayed on the image display section.

* * * * *